(12) United States Patent
Garrison et al.

(10) Patent No.: US 9,943,092 B1
(45) Date of Patent: Apr. 17, 2018

(54) LIQUID PROCESSING SYSTEM AND METHOD

(71) Applicants: Roy Lee Garrison, Cantonment, FL (US); Charles Paul McNemar, Gulf Breeze, FL (US)

(72) Inventors: Roy Lee Garrison, Cantonment, FL (US); Charles Paul McNemar, Gulf Breeze, FL (US)

( * ) Notice: Subject to any disclaimer, the term of this patent is extended or adjusted under 35 U.S.C. 154(b) by 178 days.

(21) Appl. No.: 14/979,054

(22) Filed: Dec. 22, 2015

Related U.S. Application Data

(60) Provisional application No. 62/095,122, filed on Dec. 22, 2014.

(51) Int. Cl.
| | |
|---|---|
| *F02M 27/04* | (2006.01) |
| *A23L 3/00* | (2006.01) |
| *C02F 1/48* | (2006.01) |
| *A23L 2/70* | (2006.01) |

(52) U.S. Cl.
CPC .............. *A23L 3/001* (2013.01); *A23L 2/70* (2013.01); *C02F 1/481* (2013.01); *A23V 2002/00* (2013.01)

(58) Field of Classification Search
CPC ........ F23C 99/001; F23C 6/045; F23C 7/002; F23C 2900/06041; F23D 14/02; F23D 14/62; F23D 11/404; F23D 17/002; A23L 3/001; A23L 2/70; C02F 1/481; A23V 2002/00
USPC ......... 99/275; 431/2, 354; 210/222; 123/295
See application file for complete search history.

(56) References Cited

U.S. PATENT DOCUMENTS

| | | | | |
|---|---|---|---|---|
| 3,143,496 | A * | 8/1964 | Maretzo ................. | B03C 1/288 210/222 |
| 3,277,631 | A * | 10/1966 | Sunnen ................... | H01J 49/26 250/293 |
| 3,355,609 | A * | 11/1967 | Horn ...................... | H02K 44/08 310/11 |
| 3,439,899 | A * | 4/1969 | Hershler .................. | B01J 8/42 204/155 |
| 4,136,016 | A * | 1/1979 | Rosensweig ............... | B01J 8/42 208/134 |
| 4,170,447 | A * | 10/1979 | Goldstein ............... | B03C 1/002 110/342 |
| 4,201,140 | A * | 5/1980 | Robinson ............... | C10G 32/02 110/218 |
| 4,226,720 | A * | 10/1980 | Brigante .................. | B03C 1/02 210/222 |
| 4,238,183 | A * | 12/1980 | Robinson ............... | C10G 32/02 110/218 |

(Continued)

*Primary Examiner* — Eric Stapleton
(74) *Attorney, Agent, or Firm* — J. Nevin Shaffer, Jr.

(57) ABSTRACT

An improved liquid processing system including a first catalyst chamber with an inlet and an outlet where the outlet receives liquid to be processed, the liquid passing along the first catalyst chamber and exiting the outlet. Tubes are radially displaced within the first catalyst chamber such that the liquid flows around and over the tubes and where the tubes are filled with at least one magnet. A second catalyst chamber of like configuration is provided. The inlet of the second catalyst chamber is connected with the outlet of the first catalyst chamber A pump is connected with the liquid processing system such that liquid at the inlet of the first catalyst chamber is sucked into the first catalyst chamber at a first PSI and velocity and pushed into the second catalyst chamber at a second PSI and velocity.

20 Claims, 4 Drawing Sheets

(56) References Cited

U.S. PATENT DOCUMENTS

| | | | | |
|---|---|---|---|---|
| 4,254,557 | A * | 3/1981 | Mayer | B01D 46/32 204/155 |
| 4,254,558 | A * | 3/1981 | Mayer | B01D 46/32 204/155 |
| 4,320,003 | A * | 3/1982 | Sanderson | C02F 1/481 210/222 |
| 4,716,024 | A * | 12/1987 | Pera | B01J 19/087 210/222 |
| 4,755,288 | A * | 7/1988 | Mitchell | C02F 1/482 123/538 |
| 4,826,592 | A * | 5/1989 | Taylor | B01D 35/06 210/223 |
| 5,055,190 | A * | 10/1991 | Hayes | B03C 1/025 209/224 |
| 5,348,050 | A * | 9/1994 | Ashton | B01J 19/087 137/827 |
| 5,380,430 | A * | 1/1995 | Overton | B01J 19/087 210/222 |
| 5,622,831 | A * | 4/1997 | Liberti | B03C 1/0332 210/222 |
| 5,637,226 | A * | 6/1997 | Adam | B01J 19/087 123/536 |
| 5,656,171 | A * | 8/1997 | Strachwitz | C02F 1/481 210/175 |
| 5,882,514 | A * | 3/1999 | Fletcher | C02F 1/481 123/528 |
| 5,888,060 | A * | 3/1999 | Velke | F23K 5/20 110/238 |
| 5,958,282 | A * | 9/1999 | Raj | H01F 1/445 252/62.51 R |
| 6,235,202 | B1 * | 5/2001 | Ohkawa | B03C 1/023 209/12.1 |
| 6,512,215 | B2 * | 1/2003 | Dalton | B01D 53/32 219/634 |
| 6,605,213 | B1 * | 8/2003 | Ammann | B01F 9/0001 210/222 |
| 6,752,923 | B1 * | 6/2004 | Jans | B01J 19/087 210/222 |
| 7,481,924 | B2 * | 1/2009 | Takahashi | C02F 1/481 204/155 |
| 7,569,142 | B2 * | 8/2009 | Lane | B03C 1/0335 204/660 |
| 7,622,046 | B2 * | 11/2009 | Rundt | B03C 1/284 210/222 |
| 7,712,455 | B2 * | 5/2010 | Szalai | F02M 27/045 123/538 |
| 7,892,427 | B2 * | 2/2011 | Barbic | B01F 13/0059 209/213 |
| 8,052,875 | B2 * | 11/2011 | Oder | B03C 1/0335 209/214 |
| 8,202,083 | B2 * | 6/2012 | Enache | F02M 27/045 110/218 |
| 8,247,204 | B2 * | 8/2012 | Korpela | B03C 1/286 210/222 |
| 8,689,984 | B2 * | 4/2014 | Fogel | B01D 21/0009 210/222 |
| 8,714,967 | B2 * | 5/2014 | Garrison | F23C 99/001 210/222 |
| 2007/0051347 | A1 * | 3/2007 | Thalberg | F02M 27/045 123/538 |
| 2007/0205158 | A1 * | 9/2007 | Shanahan | C02F 1/481 210/695 |
| 2007/0272201 | A1 * | 11/2007 | Amano | F23C 6/045 123/295 |
| 2007/0276131 | A1 * | 11/2007 | Ferre | B03C 1/002 530/420 |
| 2008/0073280 | A1 * | 3/2008 | Cort | B03C 1/03 210/695 |
| 2008/0073283 | A1 * | 3/2008 | Cort | B03C 1/01 210/695 |
| 2008/0302001 | A1 * | 12/2008 | Koivusalmi | C10G 45/62 44/308 |
| 2009/0325109 | A1 * | 12/2009 | Enache | F02M 27/045 431/2 |
| 2010/0012567 | A1 * | 1/2010 | Bornstein | B03C 1/0332 210/222 |
| 2011/0009608 | A1 * | 1/2011 | Kim | C12N 15/1013 536/25.41 |
| 2011/0017675 | A1 * | 1/2011 | Larson | E21B 21/065 210/695 |
| 2011/0098623 | A1 * | 4/2011 | Zhang | B03C 1/01 604/5.02 |
| 2011/0207059 | A1 * | 8/2011 | Garrison | F23C 99/001 431/2 |
| 2012/0067802 | A1 * | 3/2012 | Irvin | B03C 1/0332 210/222 |
| 2012/0255913 | A1 * | 10/2012 | Tung | B03C 1/0332 210/695 |
| 2013/0043191 | A1 * | 2/2013 | Park | C12M 33/06 210/695 |
| 2014/0026856 | A1 * | 1/2014 | Bove | F02M 27/045 123/445 |
| 2014/0099253 | A1 * | 4/2014 | Kulish | F02M 27/045 423/649 |
| 2014/0202864 | A1 * | 7/2014 | Hasegawa | F02M 27/04 204/557 |
| 2014/0305874 | A1 * | 10/2014 | Stein | B03C 1/01 210/695 |
| 2015/0068964 | A1 * | 3/2015 | McAllorum | B03C 1/0332 210/223 |
| 2015/0298139 | A1 * | 10/2015 | Wilkes | B03C 1/284 96/2 |
| 2015/0300299 | A1 * | 10/2015 | Licitar | F02M 25/0224 123/538 |
| 2016/0047542 | A1 * | 2/2016 | Wiklof | F23C 99/001 431/2 |

* cited by examiner

LIQUID PROCESSING SYSTEM AND METHOD

CROSS REFERENCE TO RELATED APPLICATION

This application claims the benefit of previously filed U.S. provisional patent application No. 62/095,122 filed Dec. 22, 2014 for a "Liquid Processing System and Method". The Applicant hereby claims the benefit of this provisional application under 35 U.S.C. § 119. The entire content of this provisional application is incorporated herein by this reference.

FIELD OF THE INVENTION

This invention relates to an improved liquid processing device. In particular, in accordance with one embodiment, the invention relates to an improved liquid processing system including a first catalyst chamber with a length and a diameter and with an inlet and an outlet where the outlet receives liquid to be processed and where the liquid passes along the length of the first catalyst chamber and exits the outlet. A number of tubes are radially displaced within the first catalyst chamber such that the liquid flows around and over the tubes and where the tubes are filled with at least one magnet. A second catalyst chamber with a length and a diameter and with an inlet and an outlet is provided. The inlet of the second catalyst chamber is connected with the outlet of the first catalyst chamber such that partially processed liquid from said first catalyst chamber is received into the second catalyst chamber and passes along the length of the second catalyst chamber. A number of tubes are radially displaced within the second catalyst chamber such that the partially processed liquid flows around and over the tubes and where the tubes are filled with at least one magnet. A pump is connected with the liquid processing system such that liquid at the inlet of the first catalyst chamber is sucked into the first catalyst chamber at a first PSI and velocity and pushed into the second catalyst chamber at a second PSI and velocity.

BACKGROUND OF THE INVENTION

A problem exists in field of food processing. In particular, fresh food juices and their natural water are, according to the present art, treated for human consumption by a variety of means and methods including chemical and temperature manipulations, such as heat treatments, that destroy nutrients. The results alter the liquids that are consumed and not in an altogether beneficial manner.

Thus, there is a need in the art for an improved liquid processing system that treats liquids for human consumption, without adding chemicals or heating the liquids, such that beneficial nutrients are left.

It therefore is an object of this invention to provide an improved liquid processing system and method that treats liquids for human consumption, inter alia, in a mechanically efficient manner without adding chemicals or heat.

SUMMARY OF THE INVENTION

Accordingly, the liquid processing system and method of the present invention, according to one embodiment, includes a first catalyst chamber with a length and a diameter and with an inlet and an outlet where the inlet receives liquid to be processed and where the liquid passes along the length of the first catalyst chamber and exits the outlet. A number of tubes are radially displaced within the first catalyst chamber such the liquid flows around and over the tubes and where the tubes are filled with at least one magnet. A second catalyst chamber with a length and a diameter and with an inlet and an outlet is provided. The inlet of the second catalyst chamber is connected with the outlet of the first catalyst chamber such that partially processed liquid from the first catalyst chamber is received into the second catalyst chamber and passes along the length of the second catalyst chamber. A number of tubes are radially displaced within the second catalyst chamber such that the partially processed liquid flows around and over the tubes and where the tubes are filled with at least one magnet. A pump is connected with the liquid processing system such that liquid at the inlet of the first catalyst chamber is sucked into the first catalyst chamber at a first PSI and velocity and pushed into the second catalyst chamber at a second PSI and velocity.

All terms used herein are given their common meaning so that "liquid" identifies and describes a material that is not solid or gas. While the preferred embodiment of the present invention is directed at liquids for human consumption, obviously any liquid may be processed and treated by this means as deemed useful and beneficial. "Radially displaced" describes tube placement that is helical in form as the tubes of the invention form a spiral, and overlapping, figure along the length of the chambers when viewed end on. That is, the tubes in the chambers are spaced apart along the length of the chambers and also are rotated in connection with the chamber in relation to one tube to another, thus, again, forming a spiral.

According to another aspect of the invention, the system further includes more than one first catalyst chamber and more than one second catalyst chamber such that each combination of a first catalyst chamber and second catalyst chamber is a unit and where units are connected in series.

In another aspect, the invention further includes a fabric containing silver where the fabric is wrapped around the first catalyst chamber and the second catalyst chamber. The fabric may be embedded with silver nano particles or treated with silver in any manner now known or hereafter developed. In one aspect, the invention further includes wire wrapped around the fabric so as to hold the fabric in place. In another aspect the wire is copper wire and in a further aspect, the invention further includes a covering over the wire securing the wire in place. Applicants have found that this combination effectively shields the system of the present invention and assists in maintaining the internal effectiveness of the magnetic tubes by preventing disruption from outside forces.

In one aspect, the invention further includes a finished product storage tank connected to the outlet of the second catalyst chamber for collection and storage of fully processed liquid.

In other aspects, the Applicants have found by testing that the preferred minimum number of units is three and the preferred number of units is six According to another embodiment of the invention, a liquid processing system includes a first catalyst chamber with a length and a diameter and a center line and with an inlet and an outlet where the inlet receives liquid to be processed and where the liquid passes along the length of the first catalyst chamber and exits the outlet. A number of tubes radially displaced in spiral relation across the center line are provided within the first catalyst chamber such that the liquid flows around and over the tubes where the tubes are filled with a viscous magnetic fluid. A second catalyst chamber with a length and a diameter and a center line with an inlet and an outlet is provided where the diameter of the second catalyst chamber is smaller than the diameter of the first catalyst chamber and where the inlet is connected with the outlet of the first catalyst chamber such that partially processed liquid from the first catalyst chamber is received into the second catalyst chamber and passes along the length of the second catalyst chamber to the outlet. A number of tubes are radially displaced in spiral relation across the center line within the second catalyst chamber such that the partially processed liquid flows around and over the tubes and where the tubes are filled with a viscous magnetic fluid. A pump is connected with the liquid processing system such that liquid at the inlet of the first catalyst chamber is sucked into the first catalyst chamber at a first PSI and velocity and pushed into the second catalyst chamber at a second PSI and velocity where the second PSI and velocity are higher than the first PSI and velocity. A finished product storage tank is connected to the outlet of the second catalyst chamber for collection and storage of fully processed liquid.

As used herein, the term "viscous magnetic fluid" describes a fluid such as those manufactured for performance shock absorbers in high end race cars. The iron particles in the synthetic oil base, for example only and not by limitation, align and distribute in such a way that a more perfected magnetic field for alignment is created in Applicants' invention due to the twist from magnetic forces generated by the presence of other radially displaced tubes which thereby create a helical, spirally shaped magnetic field along the length of the chambers. Applicants' have found this to be preferred to solid magnets but solid magnets as spirally aligned as illustrated and described herein are acceptable as well.

In one aspect of this embodiment of the invention, the invention further includes more than one first catalyst chamber and more than one second catalyst chamber such that each combination of a first catalyst chamber and a second catalyst chamber is a unit and where units are connected in series.

In another aspect, the invention includes a fabric containing silver where the fabric is wrapped around the first catalyst chamber and the second catalyst chamber and wire is wrapped around the fabric so as to hold the fabric in place.

In a further aspect, the first catalyst chamber and the second catalyst chamber include a copper layer covering the first and second chambers and a silver layer where the silver layer covers the copper layer. In another aspect, the tubes in the first catalyst chamber and the tubes in the second catalyst chamber include a copper layer covering the tubes and a silver layer where the silver layer covers the copper layer. Applicants have observed a marked increased in the processing of liquids by means of the present invention in all embodiments when the interiors of the chambers and the exteriors of the tubes include this silver covered copper layer.

Likewise, according to one aspect, improved performance is obtained when the first and second catalyst chambers and the tubes are constructed from stainless steel.

According to another embodiment, a liquid processing method consists of:

a. providing a first catalyst chamber with a length and a diameter and with an inlet and an outlet where the inlet receives liquid to be processed and where the liquid passes along the length of the first catalyst chamber and exits the outlet; a number of tubes radially displaced within the first catalyst chamber such that the liquid flows around and over the tubes where the tubes are filled with at least one magnet; a second catalyst chamber with a length and a diameter with an inlet and an outlet where the inlet is connected with the outlet of the first catalyst chamber such that partially processed liquid from the first catalyst chamber is received into the second catalyst chamber and passes along the length of the second catalyst chamber to the outlet; a number of tubes radially displaced within the second catalyst chamber such that the partially processed liquid flows around and over the tubes where the tubes are filled with at least one magnet; a pump connected with the liquid processing system such that liquid at the inlet of the first catalyst chamber is sucked into the first catalyst chamber at a first PSI and velocity and pushed into the second catalyst chamber at a second PSI and velocity, and a finished product storage tank connected to the outlet of the second catalyst chamber for collection and storage of fully processed liquid; and b. connecting the pump to a power source.

In another aspect, the method further includes adding liquid to the inlet.

In one aspect, the method further includes providing multiple first catalyst chambers and second catalyst chambers connected in separate units and connecting the separate units in series.

In a further aspect, the number of units is selected from a group consisting of three or more units.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
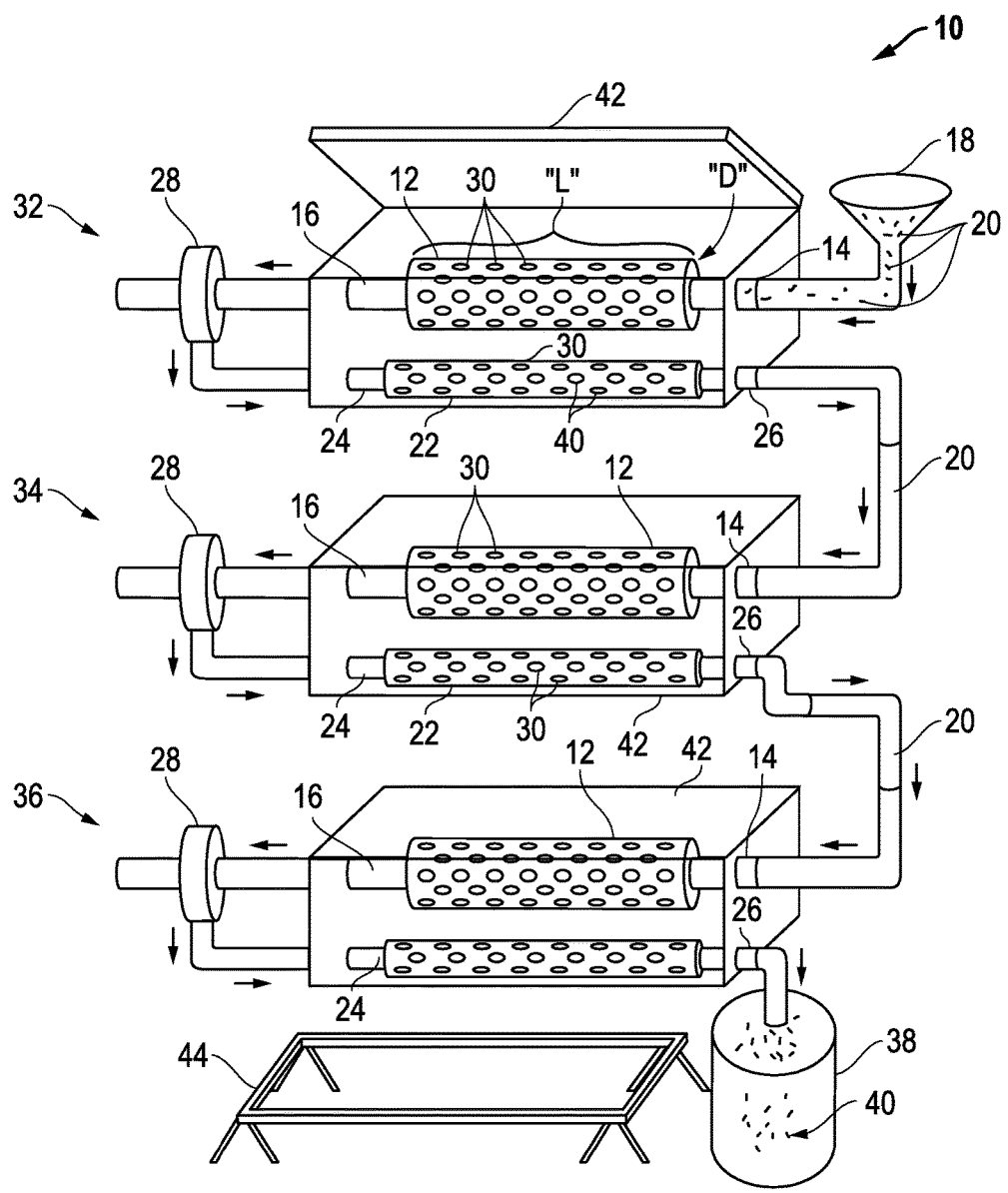
FIG. 1 is a side partial cut away view of the liquid processing system of the present invention shown with three units.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered as implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

A preferred embodiment of the present invention is illustrated by way of example in FIGS. 1-4. With specific reference to FIGS. 1 and 2, liquid processing system and method 10 according to one embodiment, includes a first catalyst chamber 12 with a length "L" and a diameter "D". First catalyst chamber 12 also includes an inlet 14 and an outlet 16. Connected with inlet 14 is a liquid receiver 18. Liquid 20 is poured into liquid receiver 18 such that liquid 20 enters liquid processing system 10 at inlet 14 of first catalyst chamber 12.

Figure 3:
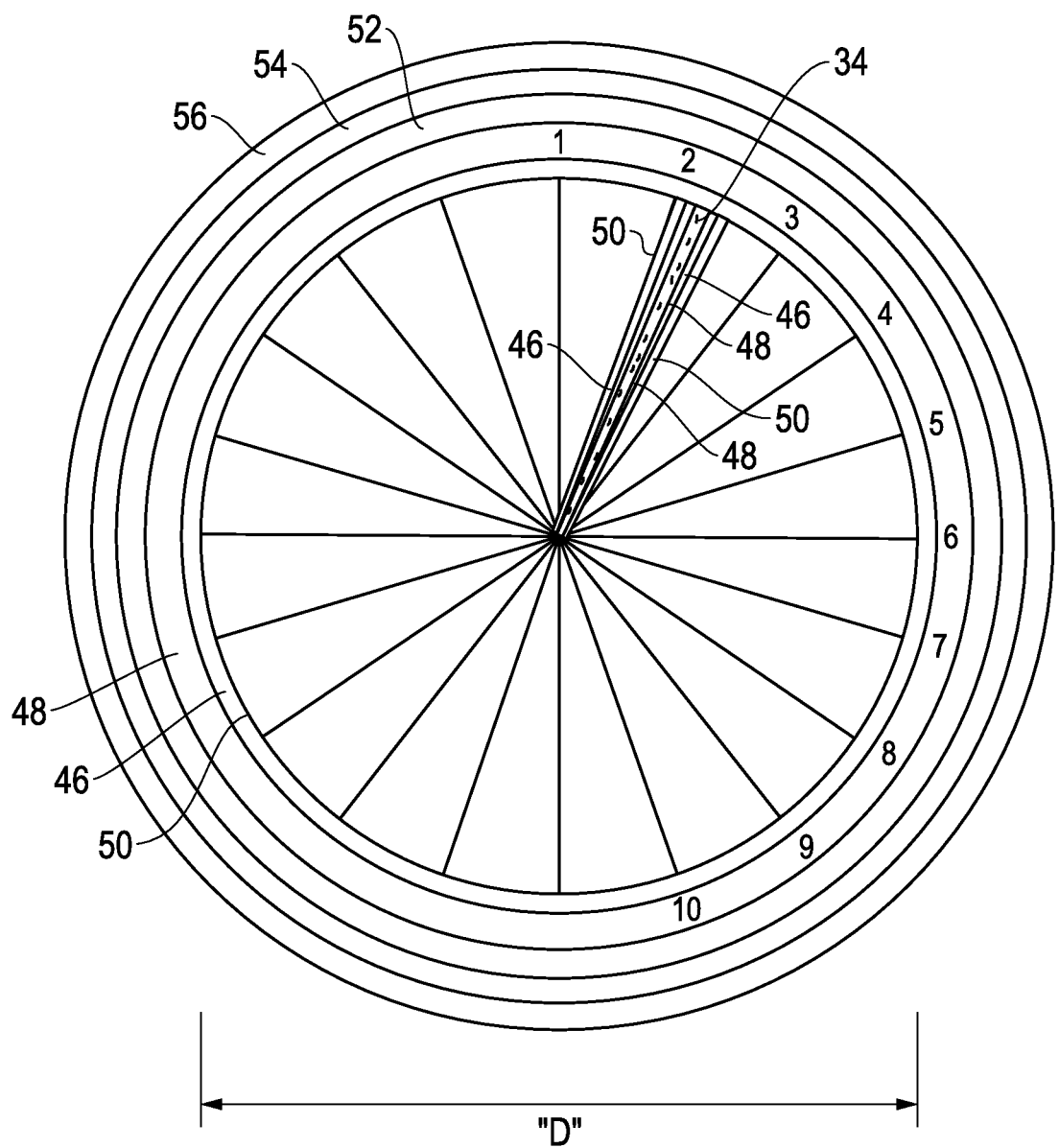
FIG. 3 is an end view of a first catalyst chamber of the invention of FIG. 1 illustrating the tubes in spaced apart relation within the chamber.

FIG. 1 also illustrates second catalyst chamber 22 with a length "L" and a diameter, however, as more clearly illustrated in comparing FIG. 3 of first catalyst chamber 12 with second catalyst chamber 22, the diameter of second catalyst chamber 22 is a smaller diameter "d". Applicants have determined that the preferred diameter for second catalyst chamber 22 is approximately twenty percent smaller than the diameter of first catalyst chamber 12, as will be discussed more fully hereafter.

Second catalyst chamber 22 includes an inlet 24 and an outlet 26. In between, preferably, inlet 24 of second catalyst chamber 22 and outlet 16 of first catalyst chamber 12 is pump 28. Pump 28 applies suction to the outlet 16 and thus to the inlet 14 of first catalyst chamber 12 thereby drawing liquid 20 into first catalyst chamber 12. Liquid 20 is then processed by the passage of liquid 20 through first catalyst chamber 12, as will be described more fully hereafter, and the partially processed liquid 20 is then forced by pump 28 into the inlet 24 of second catalyst chamber 22 for additional treatment.

Importantly, first catalyst chamber 12 and second catalyst chamber 22 include a number of radially displaced tubes 30. FIG. 1 shows this "radial" placement, creating a helical or spiral form along the length "L" of both first catalyst chamber 12 and second catalyst chamber 22. Tubes 30 include at least one magnet or, preferably, a viscous magnetic fluid 32. The placement, again, of the tubes across a center line of the tubes 30 and in radial form, ensures that liquid 20 flows over and around tubes 30 and, Applicants have determined, in a "cork screwing" manner along the chambers from inlet to outlet.

Figure 2:
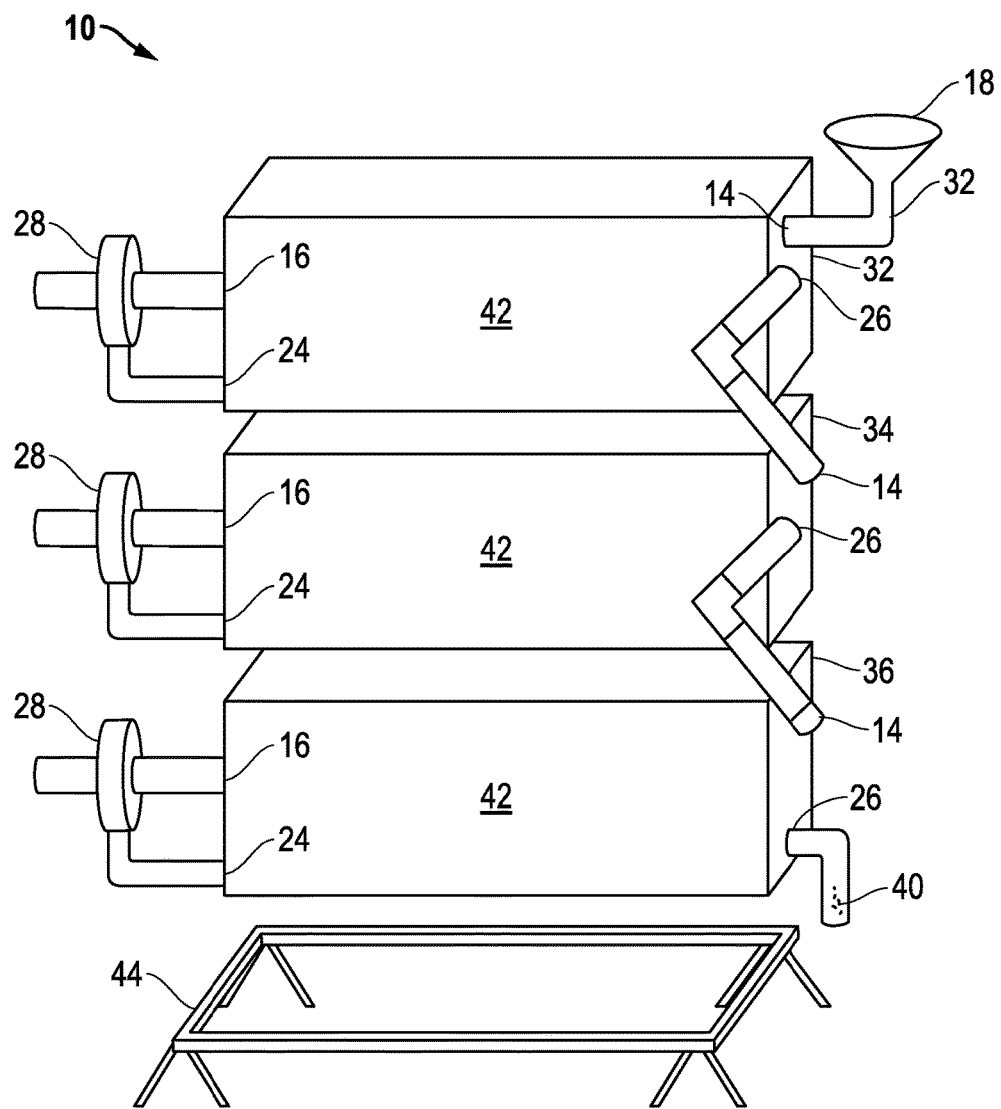
FIG. 2 is a side view of the invention of FIG. 1 illustrating the stacked three unit assembly.

Still referring to FIGS. 1 and 2, a preferred minimum number of "units" is three as three units are observed to obtain very satisfactory liquid treatment results. As used herein, the term "unit" identifies a combination of one first catalyst chamber 12 and one second catalyst chamber 22, and associated inlets, outlet, tubes and pump as described above. Thus FIGS. 1 and 2 illustrate a three tier assembly consisting of three units connected in series such that liquid 20 enters inlet 14 of the first tier 32, which passes, by means of pump 28, partially processed liquid 20 to the second tier 34 which in turn passes the processed liquid 20 to the outlet 26 of third tier 36 to be collected in a finished product storage tank 38 for storing processed liquid 40. While any number of units have been found effective for the non-chemical non-heated treatment of liquid 20, Applicants believe that at least three units and preferably six units provides the best treatment structure. For reference to FIG. 1, the three units of FIG. 1 could be seen to be stacked on top of the three units in FIG. 2, for example only and not by limitation.

Still referring to FIGS. 1 and 2, box 42 is shown for containing and supporting the elements of the invention as described herein. Box 42 may be of any desired material, preferably, however, iron. Also shown is stand 44 on which the lowest box 42 of a series of boxes 42 rests with the stand 44 supporting the remaining boxes 42 in the rest of the stack as well.

Figure 4:
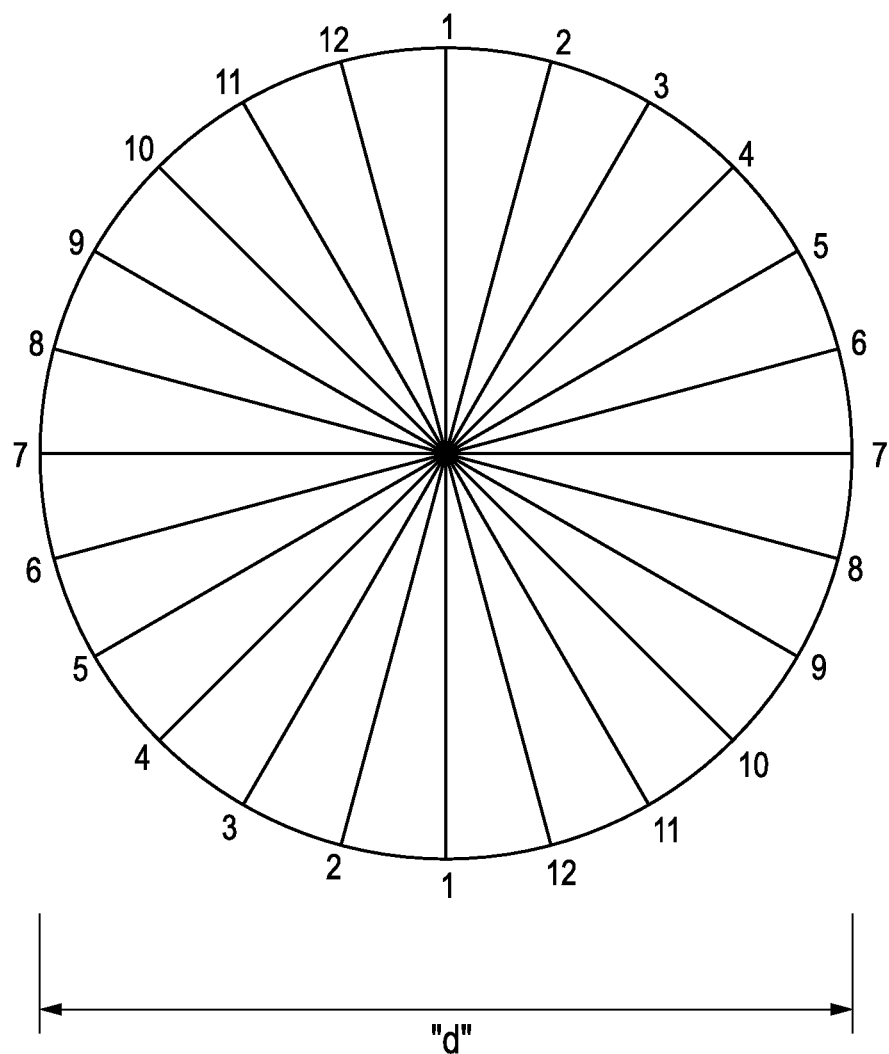
FIG. 4 is an end view of a second catalyst chamber of the invention of FIG. 1 illustrating a smaller diameter and more tubes as compared to the first catalyst chamber of FIG. 3.

Referring now to FIGS. 3 and 4, the preferred structure of the present invention is further described. FIG. 3 shows an end view and cross section of a chamber with tubes in place. In this view, first catalyst chamber 12 is shown with a diameter "D" as compared to the smaller diameter "d" shown in FIG. 4. Also, FIG. 3 illustrates the structure where ten tubes 30 are aligned in radial fashion within the chamber such that while spaced apart along the length "L" of the chamber, as shown in FIGS. 1 and 2, they are also misaligned or rotated with relation to one another. Further, preferably, the structure requires the tubes 30 to align down the center or along the center line of the chamber as shown.

FIG. 3 also illustrates a preferred structure including a copper coating 46 applied to the inside of the catalyst chamber 12 (and second catalyst chamber 22 as well, not shown) and, preferably, first and second catalyst chambers 12 and 22 are made from stainless steel 48. Also preferably, copper coating 46 is coated with silver coating 50.

Likewise, a representative tube 30 is illustrated in FIG. 3 where tube 30 preferably is made of stainless steel 48 which is coated with copper coating 46 which in turn is covered with silver coating 50. Thus, liquid 20 contacts silver coating 50 on the inside of the chambers 12 and 22 and on the outside of the tubes 30 as it is processed through the system 10. The inside of tubes 30 contain a magnet 31 or, preferably, a viscous magnetic fluid, as described herein Still referring to FIG. 3, preferably, the outside of the chambers, both first and second, are covered with fabric 52. Fabric 52 preferably is impregnated with silver or includes a silver coating or the like. Fabric 52 preferably is held in place by wire, such as copper wire 54. This wrapping has been determined by the Applicants to provide enhanced processing of liquid 20. Also, in order to seal wire 54 in place, covering 56, preferably an epoxy, covers wire 54.

Referring to FIG. 4, a preferred embodiment of the invention is shown where the diameter of the second catalyst chamber, diameter "d", is less than the diameter "D" of the first catalyst chamber 12. Additionally, it is shown that, preferably, second catalyst chamber 22 includes twelve tubes 30 while first catalyst chamber 12 has ten tubes 30.

In sum, the structure of the present invention, results in a compression and expansion of liquid 20 as it is processed, expanding into first catalyst chamber 12 and then, due to the increased number of tubes 30 in second catalyst chamber 22, slowing down initially as entering second catalyst chamber 22. As the liquid 20 is processed however it becomes less viscous and is more easily pumped into and drawn out of successive units of the invention. A controller, not shown, for the pumps 28 may be provided to ensure proper pressures and velocities.

By way of further explanation, Applicants disclose a Liquid Processing System and Method 10 for a molecular science tool used for enhanced food process technology that will vastly reduce human weight and improve human health and health care cost conditions by way of enhanced nutrition and metabolic stimulation.

The invention has been found to be particularly useful as a process for changing the typical solubility of fresh food juices and their natural water into a processed water and food nutrient of a superior quality and condition. Applicants believe the technology is beneficial and necessary because its use will result in weight loss and improved health for billions of people and billions of reduced health care cost by way of the proven benefits of micro nutrition available through fresh natural plants fruit and vegetable juice when processed through the present invention.

The operation of the invention enhances the food materials and water condition in such a way so that Applicants have found that the molecular density in all materials becomes less due to the change the invention provides in the geometrical shape of food nutrients and its H2O after passing through the inventions process. The technology works as simultaneous attraction and repulsion forces are applied by the combination of the catalyst chambers 12 and 22 and the tubes 30 that supply attraction and repulsion strong magnetic forces to the water and its food nutrient slurry, liquid 20.

The size and shape of all molecular structures is related to energy. Typically expansion is easy to see when thermal energy is applied. Heat is destructive of nutrients. However, as Applicants believe, during the present process as food and water materials pass through this invention's enhancement process the atoms associated with each molecular structure contained in the fluid slurry in natural atomic levels of movement and or rotation are exposed to magnetic forces that apply attracting forces on atoms which have their rotation opposition to the polarity of the inward polarity of the present process invention. Where the invention also simultaneously applies the same forces at the atomic level on these molecular structures that have their shared atoms rotating in different alignment positions. These two forces produced by the invention and applied at the atomic level allow for conditions that can replace nutrient destroying thermal energy or cooking process heat. Thereby, the forces applied by the invention allow for expansions of the geometrical shape of these molecular structures that, in turn, allow for energy to be produced faster in such a way that enhance the digestion and metabolism for energy release and huge reduction the ability for the body to store fat, as well as an increased ability to burn energy already stored as fat.

By way of additional disclosure, the Applicants further describe the invention as follows:

The invention results in a unique processed liquid by producing less density in water and micro nutrients that have not been damaged by heat. Few people realize that water at the molecular levels is not the same even though the water chemistry is still H2O. The Applicants have observed that the molecular structure of water itself has become more dense because the present industrially chemically conditioned water changes the energy levels at the atomic level to a different molecular shape and by state of energy levels at the molecular levels the size and shape of the molecular structures have a lesser density than those water and food molecules with density and shape where by either heat process or conventional water treatment methods over the last 150 years or more our food and associated water quality have lowered our energy levels and produced a world of sick and overweight people due to the food and water's molecular size levels of resistance toward oxidation "non-combustibility" or lesser metabolic rate due to the lessor ability the more dense molecules have to carry oxygen.

Traditionally individuals think that only exercise can bring in more oxygen to increase the metabolism. Exercise does add oxygen to make the foods burn even better and respond to aid in removing other already stored fat. This ability to add oxygen is also provided by the present invention. That is, the present process enhances the condition of water and of foods in juiced slurry that in turn produces the effects of aiding oxygen to dissolve and when the processed liquid of the present invention is consumed, increases the body's oxidation combustion process which is referred to as metabolism rate.

Referring to FIG. 1:

In Feed start of the process where natural plant juices and their associated water is introduced into the invention.

The first process effect that consist of a silver plated MHD (magnetohydrodynamics) enhanced 316 grade Stainless Steel catalyst chamber that has been plated with copper and then overlayed with silver plating. This 1st process effect contains 10 individual 316 Stainless Steal tubes that also have been electroplated with copper and then layered by electroplating silver plating over top of the copper. These 10 rods each contain a viscus magnetic fluid and are positioned in a progressive 25 degree offset from each other along lateral lines. This first process effect is for placing static electrical energy which is generated by the process flow as feed-stocks are suctioned into the first catalyst chamber (due to) as a result of the connection to the pump and adjustable speed controlled motor that is necessary in order to regulate the process pressures and flow rates.

The first pressure feed outlet 16 connects with the inlet 24 of second catalyst chamber 22, that is 20% smaller in diameter than the suction first catalyst chamber 12 and contains twelve copper and silver plated 316 SS tubes 30 that have been filled with viscus magnetic materials and positioned across the flow inside the chamber whereby each tube 30 is offset from each other at the tube's center-line across the flow.

The outlet 24 of the second catalyst chamber 22 includes piping that applies the flow into the inlet of the second tier 34 effect of the process that repeats the first process effect with the same internal and parts configuration design that may include the speed control of pump(s) 28 with adjustable motors for adjustment of the process flow and pressures between effects.

Swivel joints attached to the outlet 26 flow piping connections locations are specifically designed for improved process parts assembly and service cleaning and inspection by enabling the lifting and the piping unfolding to allow for space of the stack assembly of the three effects without disassembling of the piping The finished product storage tank 38 holds the processed liquid 40 and elevation is provided by stack assembly mounting rack/stand 44.

Additionally, preferred parameters of the invention include flow rates and operational procedures for the invention to produce the changes in geometrical molecular size.

1. First step is to introduce the desired fluids into the inventions process inlet.
2. Pump inlet suction is negative −1.2 PSI as fluids are attracted into the first process element stage the velocity of the fluids increases to about 75 feet per second.
3. After the first pump the second process element stage converts the negative pressure applied to the fluids into a positive pressure of +30 psi and further exacerbates the fluids into the suction side of the third element located on the second tier of the invention where pressure is converted from positive +30 and reduced to +10 psi as fluids continue to increase velocity before entering the second tier and second pump.
4. At the second tier pump outlet the pressures increase to +55 psi after exiting the second tier and entering into the third suction at the third process tier.
5. The third pump inlet receives a high velocity 250 feet per second positive pressure of +55 psi
6. The third tear pump pushes the fluids pressures to +100 psi @ 400 feet per second @ 50 gallons per minute flow rate where the kinetic energy derived from flow in combination with the MHD effect (magnetiohydrodynamicc) produce the molecular changes in shape of the molecules structures and enlarging their size in such a way that more oxygen can be dissolved inside these NES processed fluids.

It should be understood that the number of catalysts and the number of viscous magnetic fluid filled tubes may vary from the preferred embodiment disclosed herein.

By way of further disclosure:
(1.) The catalysts of the invention are plated inside with silver;
(2.) This invention uses all high medical/food grade 316 stainless steal metals that are
(3.) electroplated copper coated first and
(4.) secondarily are silver plated to create the much cleaner and longer process time necessary and specific for the invention only.
(5.) Further, the tubes have (fluid magnetics) inside the tubes and three times more magnetic tube effects that
(6.) are produced entirely from silver coated medical grade stainless steal tubes and
(7.) all inside piping components are medical grade 316 Stainless Steal and first copper coated that allow for a electroplated silver antimicrobial finish inside and out.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A liquid processing system comprising:
   a. a first catalyst chamber with a length and a diameter and with an inlet and an outlet wherein said inlet receives liquid to be processed and wherein said liquid passes along the length of said first catalyst chamber and exits said outlet;
   b. a plurality of tubes radially displaced within said first catalyst chamber such that said liquid flows around and over said plurality of tubes wherein said plurality of tubes are filled with at least one magnet;
   c. a second catalyst chamber with a length and a diameter with an inlet and an outlet wherein said inlet is connected with said outlet of said first catalyst chamber such that partially processed liquid from said first catalyst chamber is received into said second catalyst chamber and passes along the length of said second catalyst chamber to said outlet;
   d. a plurality of tubes radially displaced within said second catalyst chamber such that said partially processed liquid flows around and over said plurality of tubes wherein said plurality of tubes are filled with at least one magnet; and
   e. a pump connected with said liquid processing system such that liquid at said inlet of said first catalyst chamber is sucked into said first catalyst chamber at a first PSI and velocity and pushed into said second catalyst chamber at a second PSI and velocity.

2. The system of claim 1 further including more than one first catalyst chamber and more than one second catalyst chamber such that each combination of a first catalyst chamber and second catalyst chamber is a unit and wherein units are connected in series.

3. The system of claim 1 further including a fabric containing silver wherein said fabric is wrapped around said first catalyst chamber and said second catalyst chamber.

4. The system of claim 3 further including wire wrapped around said fabric so as to hold said fabric in place.

5. The system of claim 4 wherein said wire is copper wire.

6. The system of claim 3 further including a covering over said wire securing said wire in place.

7. The system of claim 1 further including a finished product storage tank connected to said outlet of said second catalyst chamber for collection and storage of fully processed liquid.

8. The system of claim 2 comprising three units.

9. The system of claim 2 comprising six units.

10. A liquid processing system comprising:
    a. a first catalyst chamber with a length and a diameter and a center line and with an inlet and an outlet wherein said inlet receives liquid to be processed and wherein said liquid passes along the length of said first catalyst chamber and exits said outlet;
    b. a plurality of tubes radially displaced in spiral relation across the center line within said first catalyst chamber such that said liquid flows around and over said plurality of tubes wherein said plurality of tubes are filled with a viscous magnetic fluid;
    c. a second catalyst chamber with a length and a diameter and a center line with an inlet and an outlet wherein the diameter of said second catalyst chamber is smaller than the diameter of said first catalyst chamber and wherein said inlet is connected with said outlet of said first catalyst chamber such that partially processed liquid from said first catalyst chamber is received into said second catalyst chamber and passes along the length of said second catalyst chamber to said outlet;
    d. a plurality of tubes radially displaced in spiral relation across the center line within said second catalyst chamber such that said partially processed liquid flows around and over said plurality of tubes wherein said plurality of tubes are filled with a viscous magnetic fluid;
    e. a pump connected with said liquid processing system such that liquid at said inlet of said first catalyst chamber is sucked into said first catalyst chamber at a first PSI and velocity and pushed into said second catalyst chamber at a second PSI and velocity wherein said second PSI and velocity are higher than the first PSI and velocity; and f. a finished product storage tank connected to said outlet of said second catalyst chamber for collection and storage of fully processed liquid.

11. The system of claim 10 further including more than one first catalyst chamber and more than one second catalyst chamber such that each combination of a first catalyst chamber and a second catalyst chamber is a unit and wherein units are connected in series.

12. The system of claim 10 further including:
   a. a fabric containing silver wherein said fabric is wrapped around said first catalyst chamber and said second catalyst chamber; and
   b. wire wrapped around said fabric so as to hold said fabric in place.

13. The system of claim 10 wherein said first catalyst chamber and said second catalyst chamber include a copper layer covering said first and second chambers and a silver layer wherein said silver layer covers said copper layer.

14. The system of claim 10 wherein said plurality of tubes in said first catalyst chamber and said plurality of tubes in said second catalyst chamber include a copper layer covering said plurality of tubes and a silver layer wherein said silver layer covers said copper layer.

15. The system of claim 10 wherein said first and second catalyst chambers and said plurality of tubes are stainless steel.

16. The system of claim 11 comprising three or more units.

17. A liquid processing method comprising:
   a. providing a first catalyst chamber with a length and a diameter and with an inlet and an outlet wherein said inlet receives liquid to be processed and wherein said liquid passes along the length of said first catalyst chamber and exits said outlet; a plurality of tubes radially displaced within said first catalyst chamber such that said liquid flows around and over said plurality of tubes wherein said plurality of tubes are filled with at least one magnet; a second catalyst chamber with a length and a diameter with an inlet and an outlet wherein said inlet is connected with said outlet of said first catalyst chamber such that partially processed liquid from said first catalyst chamber is received into said second catalyst chamber and passes along the length of said second catalyst chamber to said outlet; a plurality of tubes radially displaced within said second catalyst chamber such that said partially processed liquid flows around and over said plurality of tubes wherein said plurality of tubes are filled with at least one magnet; a pump connected with said liquid processing system such that liquid at said inlet of said first catalyst chamber is sucked into said first catalyst chamber at a first PSI and velocity and pushed into said second catalyst chamber at a second PSI and velocity; and a finished product storage tank connected to said outlet of said second catalyst chamber for collection and storage of fully processed liquid; and
   b. connecting said pump to a power source.

18. The method of claim 17 further including adding liquid to said inlet.

19. The method of claim 17 further including providing multiple first catalyst chambers and second catalyst chambers connected in separate units and connecting the separate units in series.

20. The method of claim 19 comprising three or more units.

* * * * *